(12) United States Patent
Gearhart (10) Patent No.: US 7,094,308 B1
(45) Date of Patent: Aug. 22, 2006

(54) METHOD FOR SEALING AN ANNULAR SPACE

(76) Inventor: Stephen V. Gearhart, 515 5th St., P.O. Box 398, Hudson, IA (US) 50643

( * ) Notice: Subject to any disclaimer, the term of this patent is extended or adjusted under 35 U.S.C. 154(b) by 336 days.

(21) Appl. No.: 10/636,413

(22) Filed: Aug. 7, 2003

Related U.S. Application Data (62) Division of application No. 09/681,417, filed on Mar. 30, 2001, now Pat. No. 6,641,688.

(51) Int. Cl.
*B32B 31/00* (2006.01)
*F16L 55/18* (2006.01)

(52) U.S. Cl. .................. 156/293; 156/294; 138/97; 405/184.1; 405/184.2

(58) Field of Classification Search ............ 264/36.15, 264/36.16
See application file for complete search history.

(56) References Cited

U.S. PATENT DOCUMENTS

| | | | |
|---|---|---|---|
| 4,434,115 A | 2/1984 | Chick | |
| 4,439,469 A | 3/1984 | Wood | |
| 4,693,482 A | 9/1987 | Daigle et al. | |
| 5,285,817 A | 2/1994 | Sigel | |
| 5,405,218 A | 4/1995 | Hyde-Smith | |
| 5,415,499 A | 5/1995 | Hyde-Smith | |
| 5,879,501 A | 3/1999 | Livingston | |
| 6,068,725 A | 5/2000 | Tweedie et al. | |
| 6,069,117 A * | 5/2000 | Onan et al. | ................ 507/202 |

FOREIGN PATENT DOCUMENTS

| | | | |
|---|---|---|---|
| EP | 0260220 | * | 3/1988 |
| GB | 2157796 | * | 11/1985 |
| JP | 03242261 | * | 10/1991 |
| JP | 06241379 | * | 8/1994 |
| JP | 10231955 | * | 9/1998 |

* cited by examiner

*Primary Examiner*—Justin R. Fischer
(74) *Attorney, Agent, or Firm*—James C. Nemmers; Ryan N. Carter (57) ABSTRACT

A method for providing a seal in an annular space between a rehabilitative pipe liner and a conduit wall is provided. Areas on the surface of a section of a conduit wall surrounding lateral connections are provided with an expandable sealing agent, preferably during an investigative and/or cleaning inspection of the conduit section and preferably without repeated withdrawal and insertion of equipment between the provision of the agent at successive lateral connections. The rehabilitative pipe liner is then installed in the conduit section and a curing agent or agents such as heat, visible light, ultraviolet light, chemical agents, sonic energy or other radiant energy means is applied to cure or form the rehabilitative pipe liner and to cause the expandable sealing agent to expand and fill at least a portion of the annular space that may exist between the rehabilitative pipe liner and the conduit wall.

2 Claims, 6 Drawing Sheets

METHOD FOR SEALING AN ANNULAR SPACE

This is a division of U.S. patent application Ser. No. 09/681,417 now U.S. Pat. No. 6,641,688 filed on Mar. 30, 2001.

BACKGROUND OF THE INVENTION

The present invention relates generally to the field of rehabilitative conduit liners and specifically to a method for sealing gaps or annular spaces, such as those which commonly exist at the connections between service, or lateral, line openings and rehabilitative conduit liners, using a sprayed-on, cured-in-place annulus seal. Such liners are commonly used to reduce the infiltration and inflow of extraneous ground water into sewer collection systems and the release of untreated waste into the environment. However, even with the use of such liners, there often remains an annular space between the liner and pipe, which space may provide for the entry of groundwater into, or the loss of sewer contents from, the liner at locations such as service line ports or at liner section ends (which are commonly located at manholes).

The technology of rehabilitative conduit or pipe lining is widely varied and well known in the prior art and in practice and is only described generally herein. Through relining, sewer lines may be rehabilitated without the need for expensive and labor-intensive subterranean digging, trench support installation, and the accompanying risk to workers. In general, relining is accomplished by inserting an uncured and typically cuffed liner into a length of existing sewer conduit, everting the cuffed liner through application of mechanical, hydraulic, or other force, and allowing the liner, or a coating on the liner, to cure in place. In this manner, the inserted liner becomes a rigid and continuous pipe-within-a-pipe. Typical liner inserts include resin-impregnated felt liners (or other resin-impregnated porous material), folded or flattened PVC or polyethylene pipes, or other materials. Commonly known processes include the Insituform™ cured in place pipe relining process. Because the new lining is continuous, openings must be cut in the liner shortly after installation to return sewer service to connecting lines (service lines, lateral lines, or any other connecting lines) or to existing homes or facilities whose service line connections may be covered by the newly installed liner.

The installation process for most prior art liners includes heating to effect curing of the liner during installation and subsequent cooling of the cured liner to an ambient temperature determined by the surrounding earth and the contents of the pipe. During the heating process, liners are cured and/or pressurized to mold to the interior of the host pipeline. Once the liner has cured, a minute annulus may be created due to the shrinking of the heated liner during cooling or due to conduit surface irregularities. This annulus may create a pathway for the migration of inflowing and infiltrating groundwater to enter the collection system from the exterior of the newly installed liner. In particular, this pathway allows for the entry of migrating fluid into the liner at ports such as lateral openings or at other locations where the liner is not continuous. These same locations may serve as points where sewage or waste may migrate from the system.

Typically, the points of entry include not only the lateral or house service line connections or ports, but also the beginning and ending of pipe liner sections at locations such as manholes. All intersecting or joining pipes or conduits are referred to herein generally as lateral lines. At the manholes, the annular space may be easily accessible for a post-liner-installation annulus sealing, as illustrated in U.S. Pat. No. 5,879,501 issued Mar. 9, 1999 to Livingston. However, for remote lateral connections, the annulus is hidden by virtue of its location and by virtue of the newly installed liner, and the lateral connection is not readily accessible. When the liner is cut at the ports at these remote locations to return service to the lateral lines, migrating waste or water may move between the newly lined pipe and the annular space.

The known technology for returning service to existing lateral lines employs a remotely controlled sled which may be driven or pulled through a lined pipe and which includes a cutting arm. The cutting arm is longitudinally retractable from a typically cylindrical body and has on its end a rotary cutting blade or bit that may be used to open ports by cutting through the liner at the points of lateral connections. Because service must quickly be returned to the sealed lateral line connections to prevent the back-up of sewage or waste through lateral lines, the cutting often must occur before the recently installed liner is completely cured. The uncured liner, when exposed to the violence of the cutting process, tends to shower uncured resin about the area of cutting. This uncured resin, along with other debris, may pollute remote sensing equipment. Because the resin may become impossible or unduly burdensome to remove without causing damage to the sensors if allowed to cure after arriving on a lens, light or sensor, workers must frequently withdraw the sensors from the confined space to a location, such as a manhole, where they may manually clear the sensor of resin and dirt. Then, workers must relocate the lateral service connection and continue the cutting operation. The process of repeated withdrawal, cleaning, and relocation dramatically increases the time and labor costs associated with pipe rehabilitation.

Similarly, prior methods for sealing the annular space between the liner and the conduit at lateral connections have required exorbitant, expensive and time-consuming labor and repeated insertion and withdrawal of equipment or liner elements. Therefore, in addition to the labor expended to perform the cleaning and periodic repair that is required in association with the use of traditional cutters, labor and time must be expended in yet a further step in the process of sewer rehabilitation. In the field of sewer maintenance, where the investment of employee time, vehicle time and equipment time in a project directly impacts project cost, and therefore profit, it is imperative to eliminate or minimize process steps to remain competitive. Therefore there has been and remains a need for a method to seal junctions between rehabilitative liners and adjoining pipes that will allow fast and convenient sealing with a minimum need for the investment of labor and time.

U.S. Pat. No. 5,879,501 discloses a method for sealing openings in sewer manholes wherein a polymeric coating is formed on the interior surface of manhole walls, and a generally tube-shaped polymeric sealing member that is coaxially aligned with the coating is formed to be integral with the coating. After these coatings and tube-shaped members are cured, a rehabilitative liner is inserted through the cured tube and coating. The rehabilitative liner is selected to have an exterior surface adapted to permanently bond with the already-cured tubular sealing member. The '501 patent therefore teaches a sealant method for use in a manhole opening wherein an annulus sealer is sprayed and cured in place to form a hardened gasket prior to the introduction of a rehabilitative pipe liner. In fact, the '501 patent describes the process as demanding the use and removal of forms to create the tube-shaped sealing member and optional additional steps of roughening the cured sealing member with sandpaper or other abrasive means to create a mechanical bond that will enhance the chemical bond between the later-installed liner and the previously cured sealing member.

U.S. Pat. No. 4,439,469 issued Mar. 27, 1984 to Wood discloses a method for the rehabilitative lining of sewer pipes. In the '469 patent the process for liner installation is described generally, without reference to the sealing of resultant annular spaces. U.S. Pat. No. 5,405,218 issued Apr. 11, 1995 to Hyde-Smith discloses a method for spray-applying a fast curing rehabilitative manhole liner as a combination of a sprayed-on compound having at least two isocyanate groups and a sprayed on amine-terminated compound having at least two reactive amine groups. U.S. Pat. No. 6,068,725 discloses a post-lining sealant method wherein a resin-impregnated liner in the general shape of a top hat is placed at a lateral opening in a cured rehabilitative liner and forced into the lateral line and outward through the use of an inflatable bladder. The bladder is part of an installation device that is positioned in the rehabilitative liner at the lateral line and controlled from a remote location. Through the use of the top-hat configuration, a seal is allowed to cured on the interior of the rehabilitative liner and the interior of the lateral line to cover the connection and the annular space from the liner interior. Finally U.S. Pat. No. 4,434,115 discloses a method for lining side or lateral connection pipes. None of these prior art patents disclose a method for placing an unactivated sealant at points of future liner ports and causing the sealant to be activated to form an annulus gasket after installation of the liner through application of a curing means to the rehabilitative liner.

Therefore, there has been and remains a need for an improved method to seal the annular space that may be formed between a pipe and a rehabilitative liner inserted into the pipe. Such an improved method is needed to lessen the requirement for labor expense associated with extra process steps in addition to worker downtime as multiple layers of liner or sealer are applied, allowed to cure, and subsequently treated in anticipation of receiving a rehabilitative liner.

SUMMARY OF THE INVENTION

An annulus sealant and method employs an expandable material, such as a heat-activated urethane foam, that may be sprayed in an unactivated or at least partially unexpanded state onto lateral or side connections or manhole ports prior to pipe relining. The expanding material is activated by the means applied to cure the rehabilitative pipe liner upon installation. In this manner, the present invention allows convenient application of uncured annulus sealant to appropriate locations during an initial investigation or preparatory viewing or cleaning of the pipe to be lined. An applicator for the foam or other uncured gasket-forming material may be mounted along with the television camera or other remote sensing equipment and the foam may be applied during such an initial observation and/or cleaning step. By combining the spraying of lateral line sealant with an initial investigative step, and by combining curing of lateral line sealant with the curing of the rehabilitative pipe liner, the need for additional loading, locating, withdrawal, and insertion is minimized or eliminated. Because the expansion and curing of the sealant gasket occurs during the time coinciding with and surrounding the curing of the rehabilitative pipe liner, excess gasket-forming sealant may be liberally applied and later cut in the same process that allows cutting of the lateral line opening, i.e., the newly formed gasket may be cut along with the newly cured rehabilitative pipe liner. This method of application and curing allows for access of the expanding foam into cracks, fissures, and along the annular space that may exist due to surface irregularities or due to shrinking of the rehabilitative liner during cooling.

DESCRIPTION OF THE PREFERRED EMBODIMENT

Prior to the lining of pipes 10 with rehabilitative liners 12, closed circuit television cameras or other pieces of remote sensing equipment are commonly dragged or driven through the pipe 10 that is to be lined to verify conduit cleanliness and to locate all ports 18 such as those at the intersection of the pipe 10 and service or lateral lines 4. Identification of such ports 18 is critical to avoid missing a port 18 that might fail to appear on available sewer system maps and to avoid having a port 18 remain sealed after the liner installation is completed. It is, in general, not sufficient to rely on maps of sewer systems as such maps are often incomplete and they typically fail to illustrate all connections. Further, it is important to identify and generally clean the area to be relined. Therefore, as a necessary step in sewer line rehabilitation or relining, time and labor must be expended to observe and identify all ports of entry 18 into the line 10 to be rehabilitated.

The preferred mode of practicing the present invention maximizes the savings of time and labor by combining this observation and/or cleaning step with the placement of uncured annulus sealers 14 (illustrated in FIG. 1 as a field of dots) in the vicinity of such ports 18. Of course, once the locations of ports 18 are identified, annulus sealers or uncured gaskets 14 may be installed in other convenient or desired steps prior to installation of the liner 12. However, the application of such sealants 14 in combination with location and cleaning is preferred to maximize the number of functions that may be accomplished with each pass of equipment through the pipe 10 and to minimize the amount of employee time spent locating and relocating ports 18.

The remote sensing equipment is preferably mounted on a sled or other durable carriage for dragging or driving through the potentially hostile environment of the sewer. A pre-charged canister, cylinder, or other containment means is provided with an expandable agent 14 and a solenoid valve or other remotely controllable means is provided for releasing such material from the containment means. When the remote sensing equipment such as a television camera has allowed the operator to verify the location of a service line entry port 18, the canister may be actuated to release the expandable agent (such as urethane foam) onto the walls in the general vicinity of the port 18, including the periphery of the pipeline 10 at the service line entry ports 18 where annulus sealing gaskets are desired. The amount of material that is discharged on or otherwise applied to the the port periphery is dependent on the anticipated annulus thickness, the expansion characteristics of the material selected, and the conditions of the surrounding pipe (i.e. a more severely deteriorated pipe may present a more cracked or irregular surface and demand greater application of material to account for the spaces into which expandable urethane foam or other material may migrate).

Use of a containment means such as a canister or cylinder in combination with an inspection sled is preferred because rehabilitative liners are typically installed from manhole to manhole using a discrete length of liner. This method limits the number of ports likely to be encountered by any given length of rehabilitative liner and therefore limits the quantity of expandable material that is required in any given length of liner. However, if desired and in particular for use in combination with longer lengths of liner, a supply of unactivated agent may be provided via appropriate hosing or other conduits in cooperation with gravity feed or pumping means.

After the pipe 10 has been prepared with application of the urethane foam or other expandable material 14 onto the surfaces surrounding the service line ports 18, an uncured pipe liner (e.g. resin impregnated porous liner, folded or flattened manufactured plastic liner, etc.) may be inserted in the pipe 10. Preferably the liner 12 is applied as a cuffed tube which is subsequently everted to generally fill the interior of the original pipe. The liner is then cured in place preferably through the application of heat to the interior of the installed liner 12. During the curing process, the urethane foam or other expanding agent 14 is activated by the heat and it expands. The expanding foam creates a gasket 16 (illustrated in FIGS. 2, 3, 4 and 6 with "X" cross hatching) at each location where it expands to fill the void space between the original pipe 10 and the newly installed liner 12.

Due to the fact that most pipelines cannot be completely dried in the limited time frames available for the installation of liners, it is preferred to employ an expanding substance or urethane foam that is selected to provide the requisite expansion in a damp environment and in the presence of residual moisture.

As stated, a preferred expandable material or substance used to create such cured-in-place annulus sealers or gaskets is urethane foam. Such a material achieves the desired expansion best when applied to a clean surface having a temperature between 45 and 105 degrees farenheit. The optimum temperature of the foam for activation of the expansion is about 95 degrees farenheit, although adequate expansion has been observed ranging from 75 to 150 degrees farenheit. The Stratatech company of Des Moines, Iowa markets a typical urethane expanding foam under the trade name Stratathane. Stratathane has been found to provide desirable expansion characteristics when used in the method of the present invention. Many other expansive foam or resin materials are available and have been found to be useful.

Although the preferred method of forming such cured in place annulus sealers is to use heat activated urethane foam, other substances and activation means may be used. For example, known liners may be everted and cured in place through the application of ambient cure resins (although typically requiring longer cure times), visible-light activated resins, ultraviolet or radiation-activated resins. Therefore, expansion agents may be selected to be expandable in response to these alternative curing means. It is, however, preferred to practice the invention with a heat activated expanding gasket material because heat may be effectively transferred from within the rehabilitative liner 12 to the pre-applied gasket material 14. Rehabilitative pipe liners 12, as are known in the art, may be manufactured to allow deep penetration of light to effect deep curing and adequate strength. However, it is difficult to provide adequate light transmission through the rehabilitative liner and further into the gasket material. Water activated expansive materials may also be utilized. However, residual water in the main or lateral lines tends to prematurely activate the gasket expansion which may interfere with rehabilitative liner placement or rounding (one process for ensuring expansion of the rehabilitative liner within the existing pipe). Therefore, although these and other methods for activating or accelerating curing exist, heat is preferred due to the ease of application of heat as a curing agent and due to the general absence of sufficient renegade heat to prematurely activate curing and expansion. A second preferred method for curing is the use of a composite or multi-component gasket material wherein at least a portion or component of the composite is provided on an uncured or impregnated rehabilitative liner. Under this embodiment, curing can be effectively delayed until rehabilitative liner installation to prevent premature expansion and the possible creation of a blockage or barrier that hinders liner installation.

Figure 1:
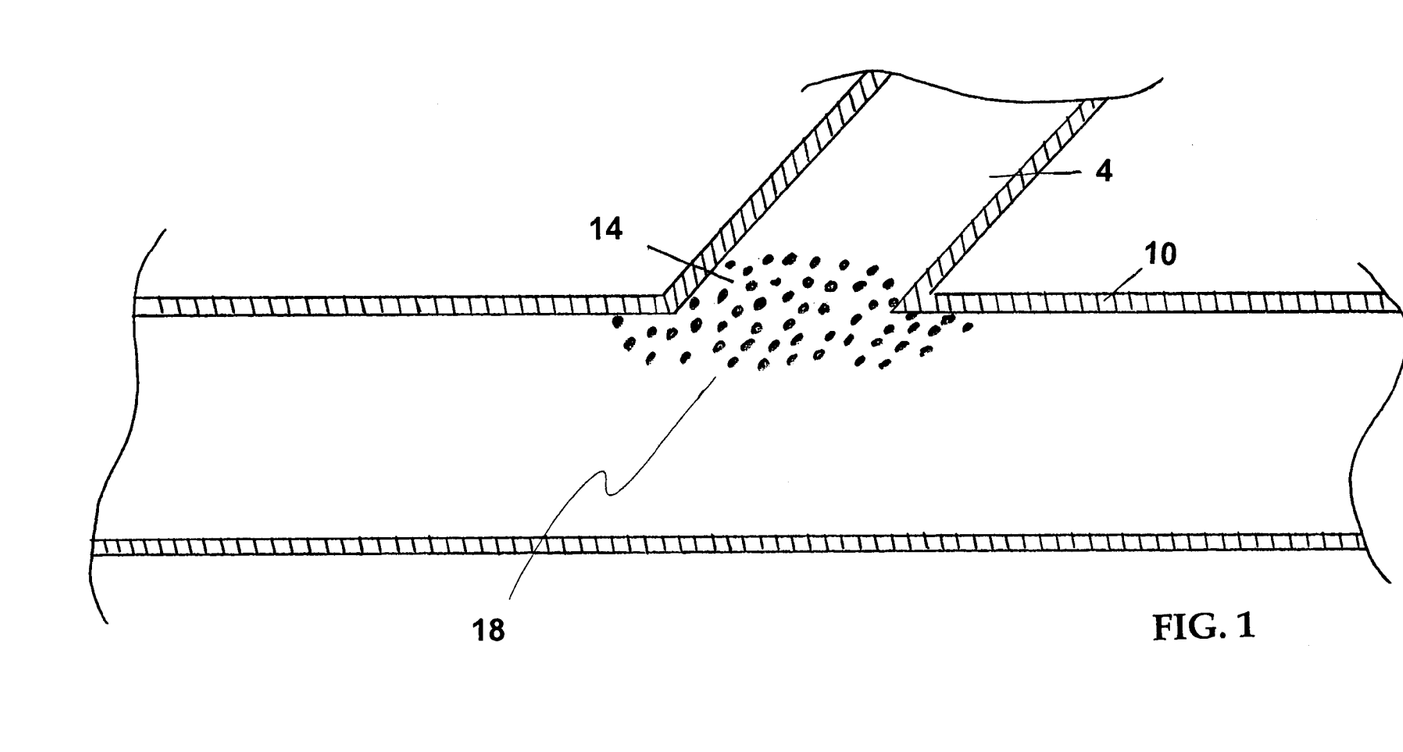
FIG. 1 reflects a cut-away perspective view of a sewer conduit and an intersecting lateral line connection wherein an unactivated expandable agent has been sprayed on the conduits at the area of intersection.
Figure 2:
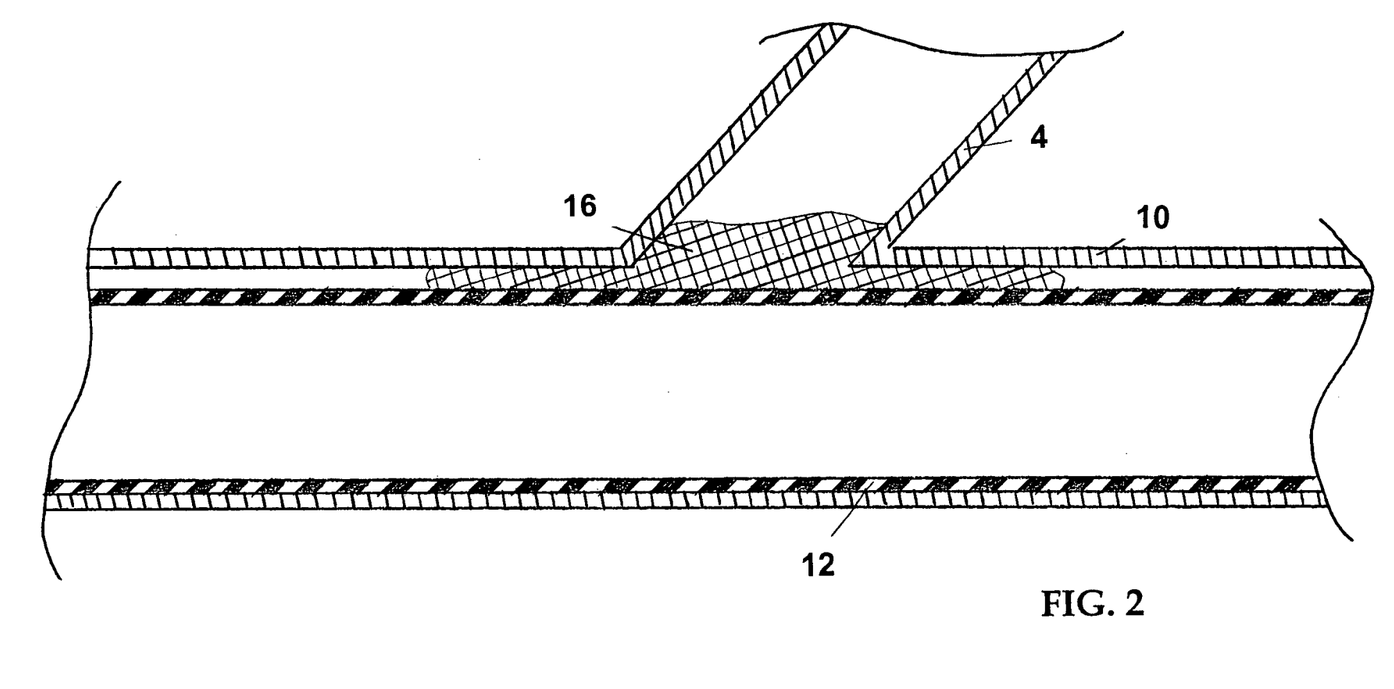
FIG. 2 reflects the setting of FIG. 1 wherein a rehabilitative conduit liner has been installed within the sewer conduit and the expandable agent has been activated and expanded to provide a pressure seal around the annular space between the conduit and the liner.
Figure 3:
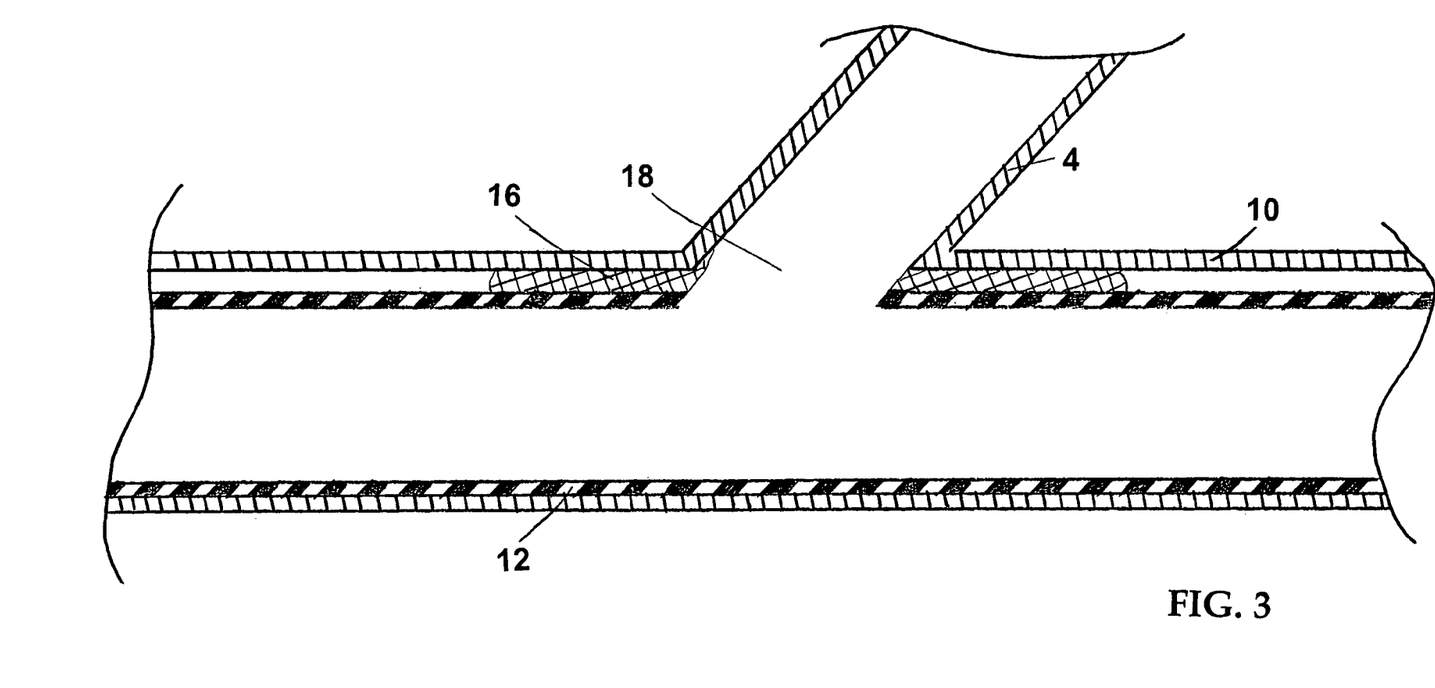
FIG. 3 reflects the setting of FIG. 1 wherein the expanded agent and rehabilitative conduit liner have been cut to restore hydraulic communication between the sewer conduit and the lateral line.
Figure 4:
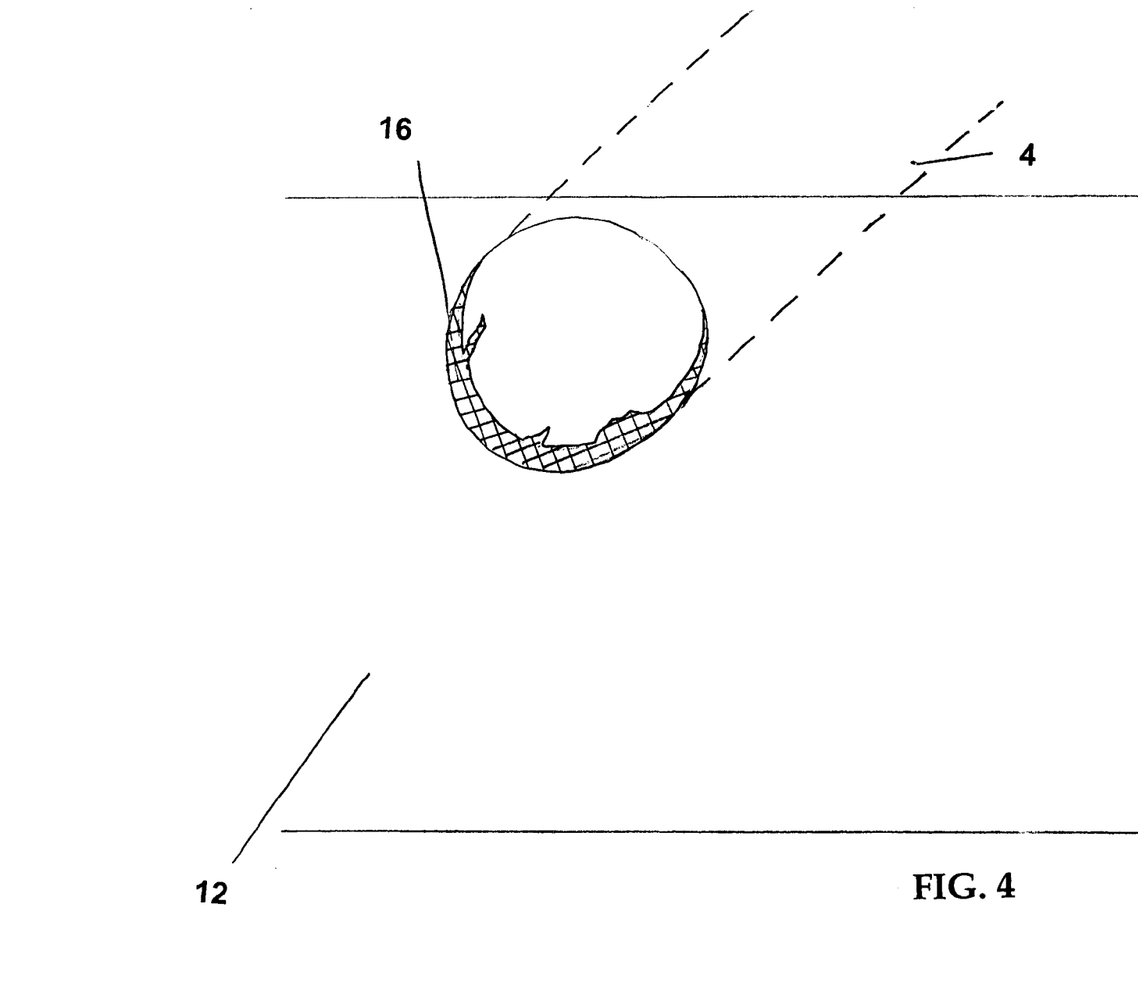
FIG. 4 reflects a detailed perspective view of the sewer conduit and lateral line intersection illustrating the expanded gasket and the penetration of agent into surface irregularities.
Figure 5:
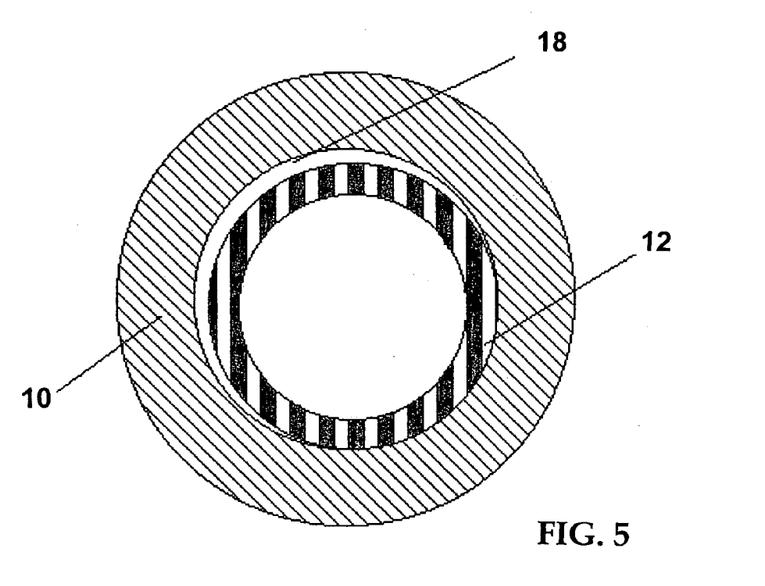
FIG. 5 reflects a cross-sectional view of a lined conduit having an annular space formed between the conduit and liner.
Figure 6:
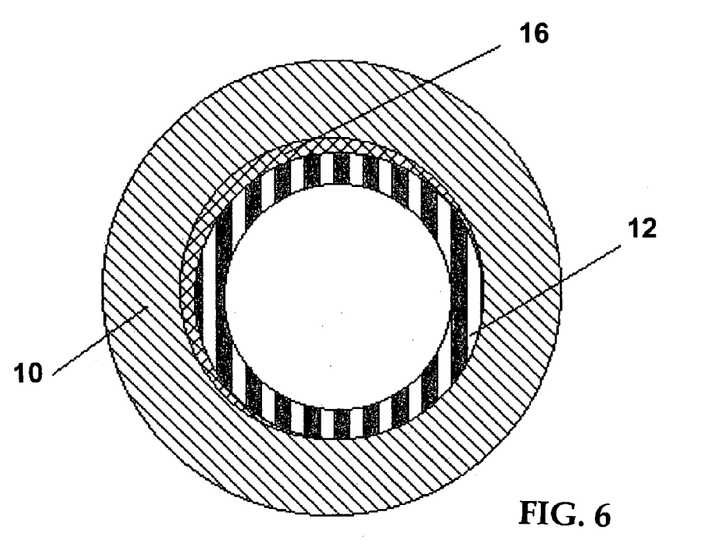
FIG. 6 reflects a cross-sectional view of a lined conduit having an expanded gasket seal in the annular space between the conduit and the liner.
Figure 7:
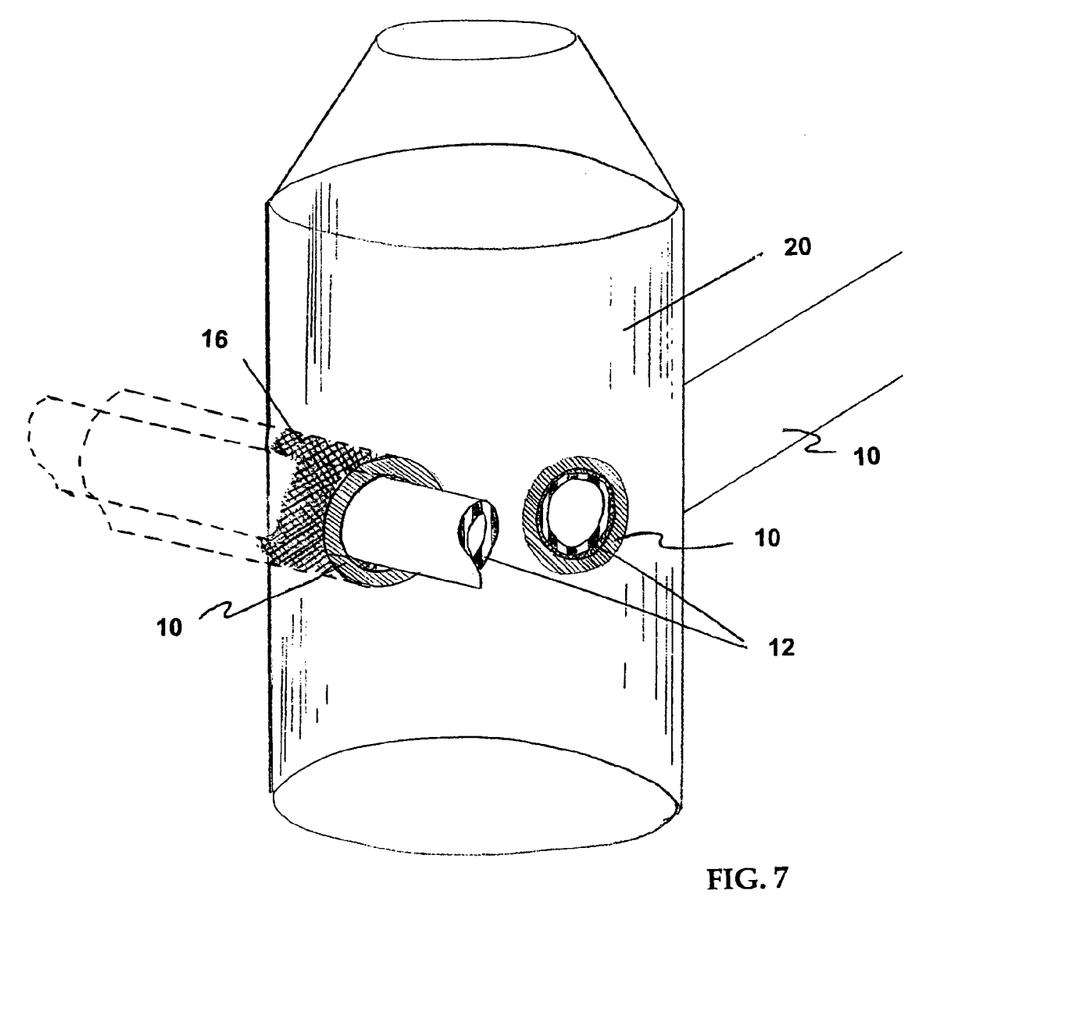
FIG. 7 reflects an interior perspective view of a manhole with an end view of a lined and sealed conduit and a see-through perspective view of a relined conduit illustrating the expansion of the sealing agent about a liner.

In FIG. 1, a section of unlined pipe 10 in the vicinity of a lateral line 4 is shown. In the figures, and in particular FIGS. 1–3, the annular space is exaggerated to illustrate the present invention. Sealant 14 has been applied to a region of the unlined pipe 10 and lateral line 4 in the vicinity of a port 18. The applied sealant 14 is unexpanded. In FIG. 2, a liner 12 has been inserted into the pipe 10 and a curing means or agent has been applied to transform the applied sealant 14 into an expanded gasket 16. In FIG. 3, a post liner installation cutting step has been performed to cut the installed liner 12 at the site of the portal 18. This cutting step also cut an opening through the expanded sealing gasket 16 to restore hydraulic communication between the lateral line 4 and the newly lined conduit 10. FIG. 4 is a detailed perspective view of the pipe section 10 in the vicinity of the lateral line 4 illustrating the expanded sealing gasket 16 and demonstrating the expansion of the gasket 16 into pipe 10 and lateral line 4 surface irregularities. FIGS. 5 and 6 illustrate a liner 12 in a pipe 10 having an annular space there between, and illustrating the annular space sealed with an expanded gasket 16. Finally, FIG. 7 illustrates an interior perspective view of a manhole 20. FIG. 7 includes an end view of a relined and annulus-sealed conduit that illustrates the conduit 10, a sealed annular space, and the installed liner 12. FIG. 7 also illustrates in a see-through drawing an installed liner 12 and conduit 10 having an expanded foam gasket 16 sealing the annular space there between. In this see-through portion of FIG. 7, an example of a natural path of expansion for the sealant material illustrates the migratory nature of the expanding material and demonstrates that, in the preferred embodiment, the sealant is liberally applied and the expanded foam gasket is conservatively formed to be more than a narrow or isolated ring of material around the liner. Of course, depending on the application or the particular conditions at a given site, more or less sealant may be applied.

Therefore, the invention as described herein is well adapted to achieve the objectives as previously stated. In particular, the invention is well adapted to provide for convenient installation of annulus sealant with a minimum of labor and effective reduction in the amount of infiltration of groundwater into the system and migration of waste from the system due to hydraulic communication between annular spaces and rehabilitative liners.

Having thus described the invention herein with reference to an exemplary embodiment, it will be understood that the exemplary embodiment is provided by way of a preferred mode and is not intended to be limiting. For example, a wide variety of materials may be employed and temperature or pressure ranges may vary depending on the composition of the rehabilitative liner, the composition of the selected expanding material, or any chemical or physical characteristic factors that may exist in any particular pipe. It will be further understood that the present invention is useful in many applications wherein the remote application of expandable material is desired in a confined space to form gaskets when activated, or wherein labor savings may be realized by combining gasket-agent application with other maintenance or rehabilitation steps.

The invention claimed is:

1. A method for sealing an annular space created between a rehabilitative conduit liner and a surrounding, coaxial conduit, said method comprising the steps of:
   (a) restricting the flow of liquid through a conduit section;
   (b) inserting a remote sensing device in said conduit section;
   (c) moving said remote sensing device through said conduit section to locate a lateral line connection;
   (d) applying an expandable material to an interior surface of the conduit at the location of said line connection;
   (e) withdrawing the remote sensing device from said conduit section;
   (f) inserting the rehabilitative conduit liner into said conduit section;
   (g) causing the expandable material to expand and form a substantially waterproof pressure seal between said rehabilitative conduit liner and said interior surface of the conduit;
   (h) inserting a conduit liner cutting device into said rehabilitative conduit liner;
   (i) cutting an opening in the rehabilitative conduit liner at the location of the lateral line connection;
   (j) removing said conduit liner cutting device form said rehabilitative conduit liner;
   (k) terminating the restriction of the flow of liquid through the conduit section.

2. The method of claim 1 wherein:
   the expandable material is applied to the conduit interior surface at a plurality of lateral connections without withdrawal of the remote sensing device from the conduit between applications.

* * * * *